United States Patent [19]
Ishimaru

[11] Patent Number: 5,307,038
[45] Date of Patent: Apr. 26, 1994

[54] ELECTROMAGNETIC COUPLING APPARATUS

[75] Inventor: Takashi Ishimaru, Gunma, Japan

[73] Assignee: Ogura Clutch Co., Ltd., Gunma, Japan

[21] Appl. No.: 500,630

[22] Filed: Mar. 27, 1990

[30] Foreign Application Priority Data

Mar. 28, 1989 [JP] Japan .................. 1-73973
Jun. 30, 1989 [JP] Japan .................. 1-168910
Jul. 6, 1989 [JP] Japan .................. 1-172950

[51] Int. Cl.$^5$ .............. H01F 27/04; H01F 15/10
[52] U.S. Cl. .................. 335/296; 336/192; 336/107; 192/84 C
[58] Field of Search .............. 335/285, 298; 192/84 C; 336/107, 192

[56] References Cited

U.S. PATENT DOCUMENTS

| | | | |
|---|---|---|---|
| 4,119,184 | 10/1978 | Mower et al. ............ | 192/84 T |
| 4,428,470 | 1/1984 | Bennett ................. | 192/84 C |
| 4,432,446 | 2/1984 | Okano .................. | 192/84 C |
| 4,935,713 | 6/1990 | Bekheet ................ | 335/296 |

FOREIGN PATENT DOCUMENTS

57-26980 6/1982 Japan .
58-8998 2/1983 Japan .

*Primary Examiner*—Leo P. Picard
*Assistant Examiner*—Raymond Barrera
*Attorney, Agent, or Firm*—Townsend and Townsend Khourie and Crew

[57] ABSTRACT

In an electromagnetic coupling apparatus, an excitation coil constituted by a plurality of turns of a winding member is covered with a resin coil bobbin. The coil bobbin can be divided into at least two members and is formed into a hollow annular shape. The divided mating surfaces of the members constituting the coil bobbin are joined to each other by ultrasonic welding.

2 Claims, 10 Drawing Sheets

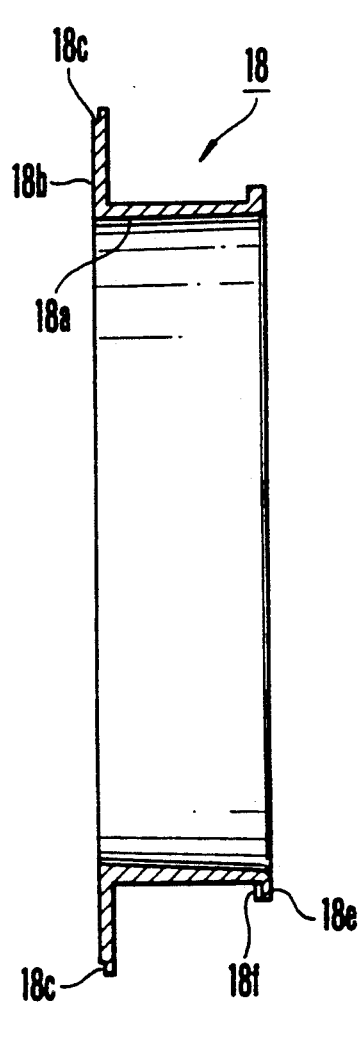 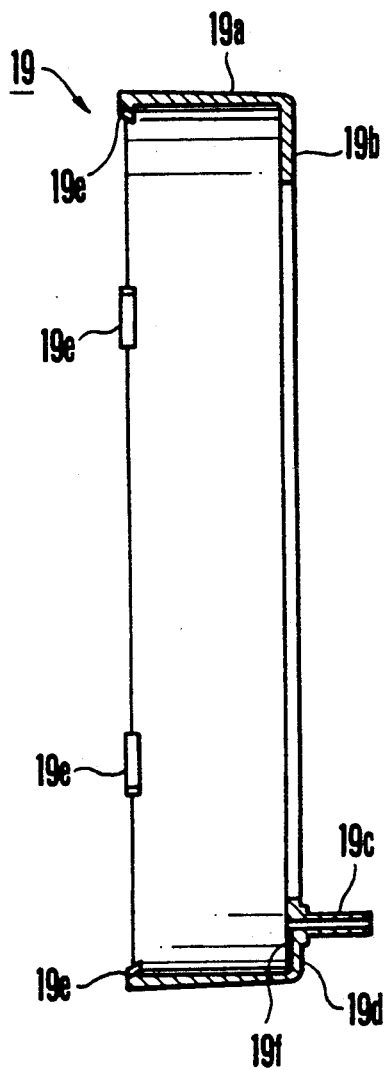
FIG.4(a)   FIG.4(b)
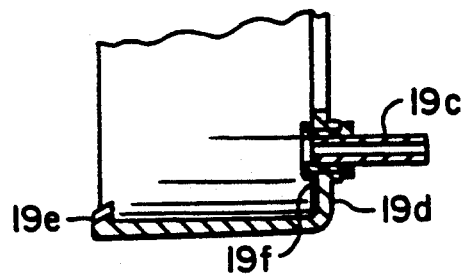
FIG. 4(c)

ELECTROMAGNETIC COUPLING APPARATUS

BACKGROUND OF THE INVENTION

The present invention relates to an electromagnetic coupling apparatus for intermittently performing transmission of rotational torque and braking of a rotating member by intermittently exciting an excitation coil.

(1) In an electromagnetic coupling apparatus such as an electromagnetic clutch or an electromagnetic brake, a conventional excitation unit for magnetically attracting an armature is designed as disclosed in, e.g, Japanese Utility Model Publication No. 60-39540.

This excitation unit is housed in an annular groove of a yoke through an insulating resin material, and is constituted by a resin coil bobbin and an excitation coil wound therearound. The coil bobbin is constituted by a cylindrical portion and flanges on both the sides thereof so as to have an annular shape having a U-shaped section as a whole. The wires of the excitation coil are wound around the coil bobbin by a plurality of turns by using a winding machine. Portions of the turn start and end portions of the excitation coil and leads which are soldered to the start and end portions are covered with insulating tubes. The yoke for housing the coil bobbin around which the excitation coil is wound is pressed into an annular shape. The yoke is constituted by a bottom plate and outer and inner flanges so as to form an annular groove and to have a substantially U-shaped section. The outer and inner flanges are tapered such that inner circumferential surfaces expand toward the opening side. Recesses are formed in the inner circumferential surfaces. A projection is formed on the annular bottom plate and extends into the annular hole, and a rubber bush is fitted in a hole formed in the bottom plate.

With this arrangement, the coil bobbin having the excitation coil wound therearound is loosely fitted in the annular groove of the yoke. After the leads of the excitation coil are inserted into the hole of the rubber bush and are extracted outside, an insulating resin material is injected into a portion around the coil bobbin and is hardened. As a result, the excitation coil is insulated and fixed in the annular groove of the yoke. In this case, since the projection is formed on the bottom plate of the annular groove so as to lift the coil bobbin from the bottom plate, the resin flows into the bottom plate side of the coil bobbin. In addition, since the recesses are formed in the inner circumferential surfaces of the flanges defining the annular groove, the resin flows into the recesses, the resin is not separated from the coil bobbin.

(2) In an electromagnetic clutch as an electromagnetic coupling apparatus mounted in a coolant compressor as, e.g., a vehicle cooling apparatus, a pair of terminals are formed in a resin terminal base fixed to the rear surface of a yoke by insert molding. An excitation coil is connected to an external electrical circuit through these terminals.

As an electromagnetic coupling apparatus of this type, for example, an apparatus disclosed in Japanese Utility Model Publication No. 57-26980 is known. An excitation unit arranged in this electromagnetic coupling apparatus has the following arrangement. A hole communicating with a through hole of a coil bobbin is formed in an annular groove bottom surface of a yoke for housing an excitation coil wound around the coil bobbin. The turn start and end portions of the excitation coil are extracted outside from this hole. A box-like resin terminal base is mounted on the coil bobbin by fitting a protruding opening portion of the terminal base in the through hole. The terminal base is fitted in a groove of a mounting plate, and is fixed to the rear surface of the yoke through a partially cut upright portion formed at the groove portion. In addition, a pair of terminals are integrally formed in the terminal base by insert molding. The turn start and end portions of the excitation coil are respectively fixed to the pair of terminals by caulking, and are electrically connected to leads fixed to the pair of terminals by caulking. The coil bobbin and the terminal base having the above-described arrangements are fixed with a caulking piece formed on an opening portion of the annular groove and a caulking piece formed at the groove portion. At the same time, a resin is injected on externally exposed portions of the excitation coil, and the connecting portions between the turn start and end portions of the excitation coil extracted into the terminal base and the terminals, and into the through hole of the yoke, thereby preventing an insulation failure or disconnection of the excitation coil and the connecting portions.

With this arrangement, the coil bobbin around which the excitation coil is wound is loosely fitted in the annular groove of the yoke, and the turn start and end portions of the excitation coil are extracted to the terminal base and connected to the terminals. Thereafter, the resin is injected on the externally exposed portion of the excitation coil and the connecting portions between the turn start and end portions of the excitation coil extracted into the terminal base and the terminals, and into the through hole of the yoke. As a result, the excitation coil is insulated and fixed in the annular groove of the yoke.

(3) In an electromagnetic clutch mounted in a coolant compressor as, e.g., a vehicle cooling apparatus, since the lengths of leads vary depending on a wiring state with respect to other auxiliary units in the vehicle, versatility of a clapper electromagnet is poor in terms of design and is uneconomical. In addition, in an electromagnetic clutch of this type, a surge killer diode is incorporated in an electrical circuit of an electromagnet. Since the diode is incorporated in the electromagnet or arranged outside the electromagnet, versatility of the electromagnet is also poor and is uneconomical.

An electromagnetic coupling apparatus for solving such problems, for example, is disclosed in Japanese Utility Model Publication No. 63-6512. This apparatus comprises an electromagnet constituted by a yoke in which an excitation coil is fixed in annular groove with an epoxy resin material or the like, and a terminal base fixed to the rear surface of the yoke with through a partially cut upright portion of a mounting plate joined to the rear surface of the yoke by solvent welding. Terminals which are formed in the terminal base by insert molding are constituted by connecting portions connected to the excitation coil, and connecting portions connected to an external electrical circuit. When the electromagnet of the electromagnetic coupling apparatus having the above-described arrangement is to be assembled, the terminal base is tentatively fixed to the yoke by bending the partially cut upright portion formed on the outer side of the mounting plate. The turn start and end portions of the excitation coil are hooked on lock pieces formed on the connecting portions as partially cut upright portions of the terminals.

Subsequently, the excitation coil and the lock pieces are integrally joined to each other by soldering or fusing. A metal lid is fitted on the terminal base. The terminal base and the lid are fixed to the yoke by expanding partially cut upright portions formed on the inner side of the mounting plate by caulking.

For example, Japanese Patent Laid-Open No. 57-51026 discloses another electromagnetic coupling apparatus. In this apparatus, a lead extracted from an electromagnet is connected to a terminal of a resin-molded surge killer diode. An external electrical circuit is connected to the electromagnet through this terminal. The ground side of the lead is fixed to a housing of a coolant compressor by integrally fixing a distal ground terminal and a resin-molded ground piece to the housing with screws.

In the conventional electromagnetic coupling apparatus described in item (1), in order to prevent an insulation failure caused by moisture which enters the excitation coil, the insulating resin material is injected between the annular groove of the yoke and the coil bobbin, as described above. Since such an operation is time-consuming, productivity is decreased, and it demands a great deal of labor.

In the conventional electromagnet coupling apparatus described in item (2), the resin is supplied to the exposed portions of the excitation coil, the connecting portions between the turn start and end portions of the excitation coil and the terminals, and the through hole of the yoke in order to prevent an insulation failure or disconnection due to vibrations or the like, as described above. Since a molding operation is required in the process of manufacture, and a long period of time must be consumed, productivity is decreased, and it demands a great deal of labor.

In the conventional electromagnetic coupling apparatus described in item (3), as a countermeasure against vibrations of a vehicle engine or vibrations during travel, a pair of terminals are formed in the resin terminal base by insert molding, and only the connecting portions to be connected to an external electrical circuit are caused to protrude into the U-shaped space side. In addition, the excitation coil and the terminals are connected to each other in the following manner. The lock pieces which are integrally formed by bending are arranged on the inner wall formed between the pair of connecting portions connected to the excitation coil and the connection portions of the terminals, and the turn start and end portions of the excitation coil are guided between the inner wall and the side surfaces of the lock pieces into the terminal base. Thereafter, the start and end portions are firmly connected to the terminals while mechanically and electrically satisfactory contact areas are ensured.

In such a structure, however, since the inner wall is present between the connecting portions or the integrally bent portions as partially cut upright portions are formed to extend upward from the terminals, the space in the terminal base cannot be effectively used.

In addition, in such an electromagnetic coupling apparatus, the interior of the terminal base must be waterproofed. However, in the conventional apparatus in which the metal lid is fixed to the resin terminal base by caulking the partially cut upright portions of the mounting plate, good quality is difficult to ensure, and problems are posed in terms of reliability.

Furthermore, when a diode is to be mounted, the diode is resin-molded to a terminal and is integrally formed by insert molding in order to provide a countermeasure against vibrations and to ensure waterproof. If such a molding operation is performed in the process of manufacture, a lead time is prolonged, operation efficiency is degraded, and problems are posed in terms of cost.

SUMMARY OF THE INVENTION

It is a first object of the present invention to provide an electromagnetic coupling apparatus which allows prevention of an insulation failure without a resin molding operation and can improve productivity.

It is a second object of the present invention to provide an electromagnetic coupling apparatus which allows prevention of an insulation failure and disconnection due to vibrations without a resin molding operation and can improve productivity.

It is a third object of the present invention to provide an electromagnetic coupling apparatus comprising an electromagnet having a terminal base which allows effective use of its inner space so as to accommodate a diode therein.

It is a fourth object of the present invention to provide an electromagnetic coupling apparatus comprising an electromagnet having a terminal base which is designed such that an opening of the terminal base in which a diode is accommodated is sealed by an upper lid and the interior of the terminal base is completely shielded from the outside.

In order to achieve the first object, according to the first aspect of the present invention, an excitation coil constituted by a plurality of turns of a winding member is covered with a resin coil bobbin which can be divided into at least two members and is formed into a hollow annular shape, and divided mating surfaces of the coil bobbin are joined to each other by ultrasonic welding.

In order to achieve the second object, according to the second aspect of the present invention, a coil bobbin is formed to be divisable and to have a hollow annular shape, an excitation coil is wound and arranged in the hollow portion, a cylindrical opening portion formed on the coil bobbin is inserted into a through hole formed in an annular groove plate of a yoke, and the turn start and end portions of said excitation coil are guided from the cylindrical opening portion into a terminal base.

In order to achieve the second object, according to the second aspect of the present invention, a protruding opening portion formed on a bottom portion of a casing of a terminal base is fitted in a hole formed in a yoke so as to perform positioning of the casing, the casing is fixed to a rear surface of the yoke through a partially cut upright portion of a mounting plate which is joined to the rear surface of the yoke by solvent welding, and a lid is forcibly fitted on an opening portion formed at an upper portion of the casing through a packing made of an elastic material, thereby shielding, from the outside, connecting portions between turn start and end portions guided through the protruding opening portion and a pair of terminals in the terminal base.

In order to achieve the second object, according to the second aspect of the present invention, a cylindrical opening portion through which turn start and end portions of an excitation coil are extracted is formed on a coil bobbin, a protruding opening portion which is fitted in a through hole formed in a yoke and allows said turn start and end portions to be inserted therein is formed on a bottom portion of a terminal base, and the protruding opening portion is forcibly fitted and fixed in the cylindrical opening portion through a rubber bush.

In order to achieve the third object, according to the third aspect of the present invention, a pair of terminals are formed in a terminal base, which is fixed to the rear surface of a yoke, by insert molding so as to extend parallel with a space formed by punching a plate member by a press, one end of each of the terminals is connected to a corresponding one of turn start and end portions of an excitation coil, the other end of each of the terminals is caused to extend from said terminal base to the outside, a diode is arranged in the space between the terminals, and leads of the diodes are respectively connected to the terminals.

In order to achieve the fourth object, according to the fourth aspect of the present invention, a casing having an opening formed in one surface thereof is arranged on a terminal base, a resin lid for sealing the opening is forcibly fitted on a forcible insertion wall formed on a periphery of the opening while a packing made of an elastic material is clamped between the lid and an end face of the periphery of the opening, a pair of terminals which are formed in the casing by insert molding are connected to turn start and end portions of an excitation coil which are inserted into the casing through rubber bushes, a diode is arranged between the pair of terminals, and leads of the diode are respectively connected to said terminals.

According to the first aspect of the present invention, the excitation coil is housed in one of the divided coil bobbins, and the leads are extracted outside. After one coil bobbin is joined to the other coil bobbin, the entire mating surfaces of the coil bobbins are joined to each other by ultrasonic welding. As a result, the excitation coil is covered with the coil bobbins. When the joined coil bobbins are forcibly inserted in the annular groove of the yoke while the leads are extracted outside, assembly of the excitation coil is completed. The excitation unit is firmly held in the annular groove of the yoke within a short period of time without resin injection, and no insulation failure occurs.

According to the second aspect of the present invention, since the coil bobbin is divided into two members and is formed into a hollow annular shape as a whole, and a waterproof effect is ensured by arranging the excitation coil in the hollow portion, no water enters from the outside of the wound excitation coil, and no insulation failure occurs.

In addition, since a waterproof effect is ensured by inserting the packing made of an elastic material in the casing of the terminal base and forcibly fitting the lid on the casing, no insulation failure occurs at the connecting portions between the turn start and end portions of the excitation coil and the pair of terminals in the terminal base.

Furthermore, since the cylindrical opening portion of the coil bobbin and the protruding opening portion of the terminal base are fitted in the through hole formed in the bottom portion of the yoke through the rubber bushes, no water enters from the through hole, and an insulation failure is prevented.

When such waterproof measures are taken, the cylindrical opening portion of the coil bobbin and the protruding portion formed on the casing of the terminal base are fitted in the through hole formed in the bottom portion of the yoke. Therefore, rotation of the coil bobbin and the casing can be prevented. In addition, removal of the coil bobbin and the like are prevented by the caulking pieces of the yoke and the partially cut upright portion of the mounting plate, and hence a countermeasure against vibrations is provided. Therefore, disconnection of the connection portions between the turn start and end portions of the excitation coil and the terminals is prevented.

According to the third aspect of the present invention, the diode is housed in the terminal base, and the electromagnet and an external electrical circuit are electrically connected to each other by connecting the electrical circuit to the terminals in the terminal base. Therefore, the design of the electromagnet need not be changed depending on the lengths of leads to be connected to the excitation coil or whether a diode is preset or not.

According to the fourth aspect of the present invention, since the resin lid is forcibly fitted on the resin terminal base and the packing made of an elastic material is inserted between the terminal base and the lid, no resin molding operation is required.

BRIEF DESCRIPTION OF THE DRAWINGS

FIGS. 1 to 6(b) show cases wherein electromagnetic coupling apparatuses of the present invention according to the first and second aspects are applied to an electromagnetic clutch, in which FIG. 1 is a longitudinal sectional view of the electromagnetic clutch, FIG. 2 is a side view of the electromagnetic clutch, FIG. 3 is a longitudinal sectional view of an excitation unit, FIGS. 4(a) and 4(b) are longitudinal sectional views of coil bobbins, FIG. 4(c) is an enlarged detail view showing an alternate embodiment of the outer coil bobbin.

FIGS. 6(a) and 6(b) are longitudinal sectional views showing main parts of coil bobbins according to another embodiment of the present invention, in which FIG. 6(a) is a longitudinal sectional view of an outer coil bobbin, and FIG. 6(b) is a longitudinal sectional view of an outer coil bobbin; and FIGS. 7 to 10(b) show cases wherein electromagnetic coupling apparatuses according to the third and fourth aspects are applied to an electromagnetic clutch, in which FIG. 7 is a longitudinal sectional view of the electromagnetic clutch, FIG. 8 is a side view of the electromagnetic clutch, FIG. 10(a) is a front view of a terminal, and FIG. 10(b) is a side view of the terminal.

DETAILED DESCRIPTION OF THE PREFERRED EMBODIMENTS

Figure 1:
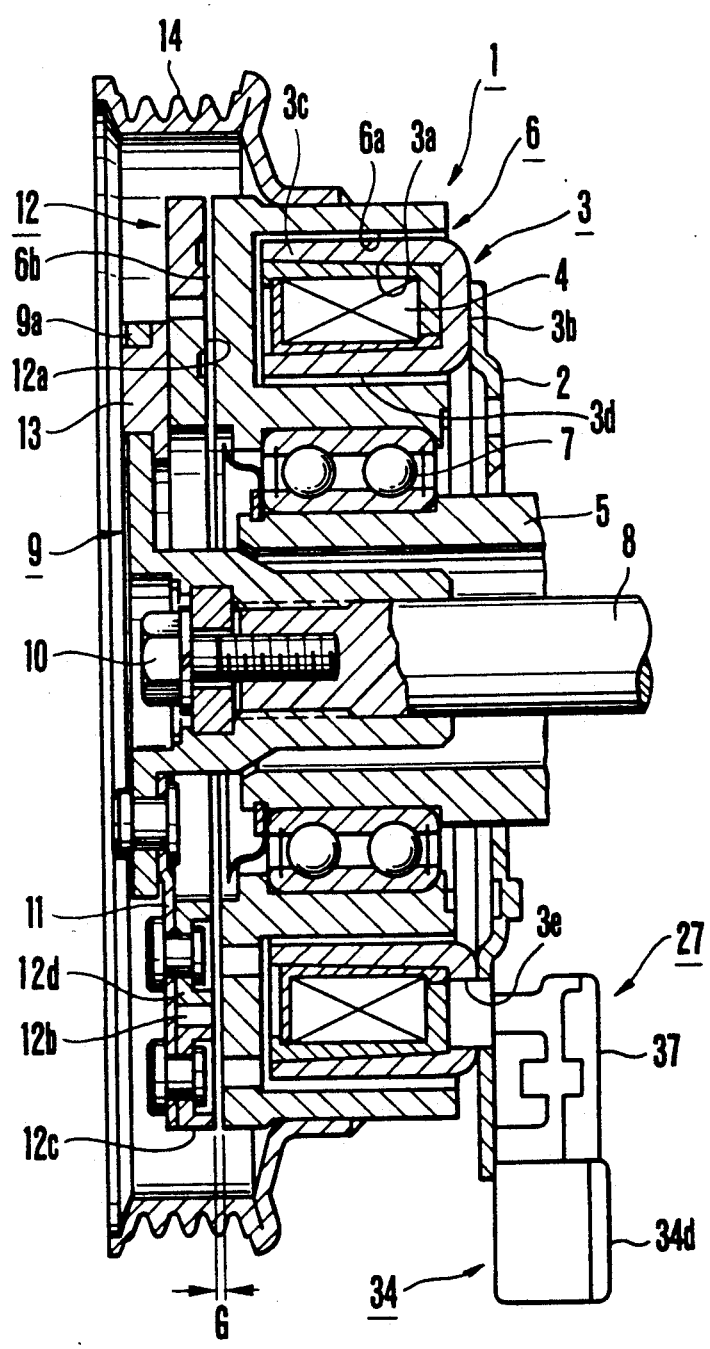
Figure 2:
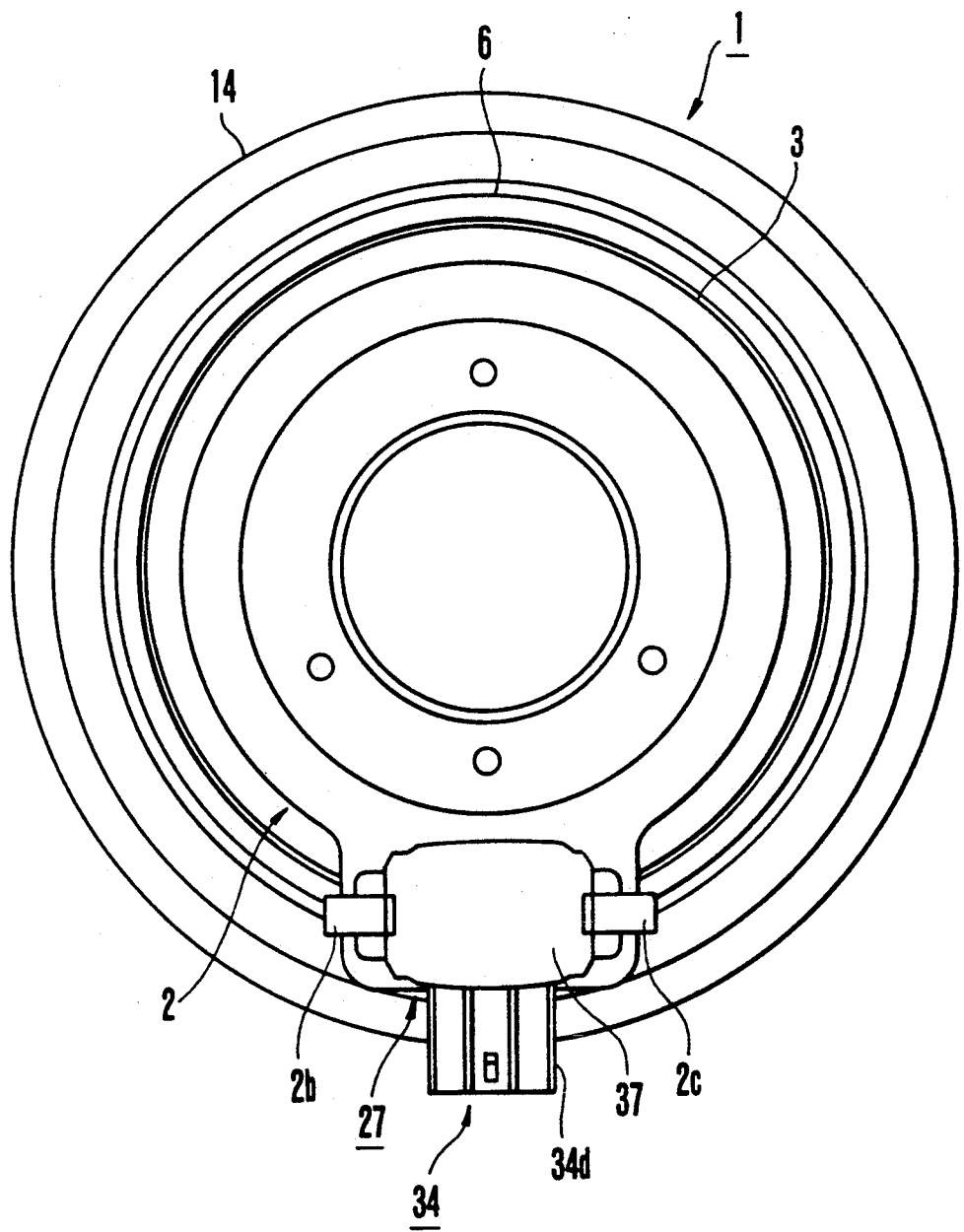
Figure 3:
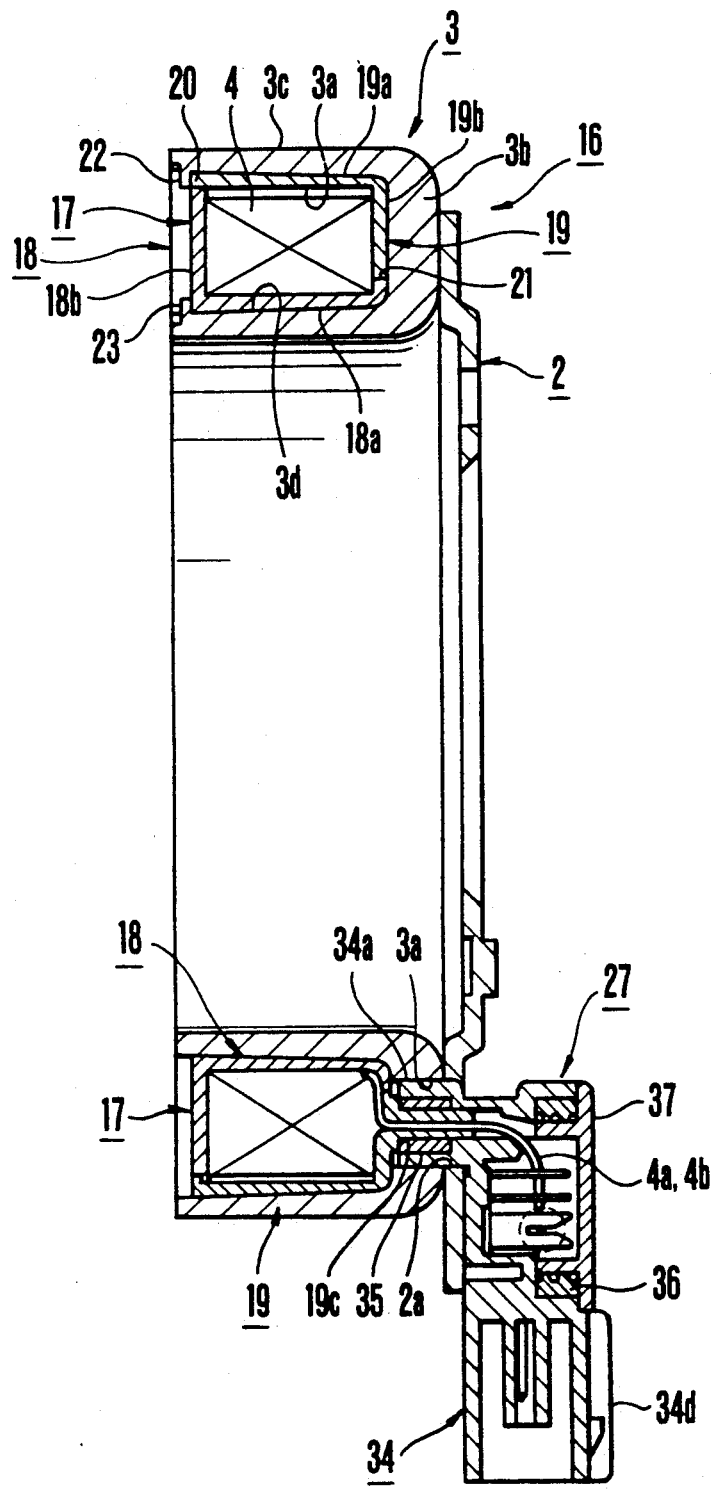
Figure 5A:
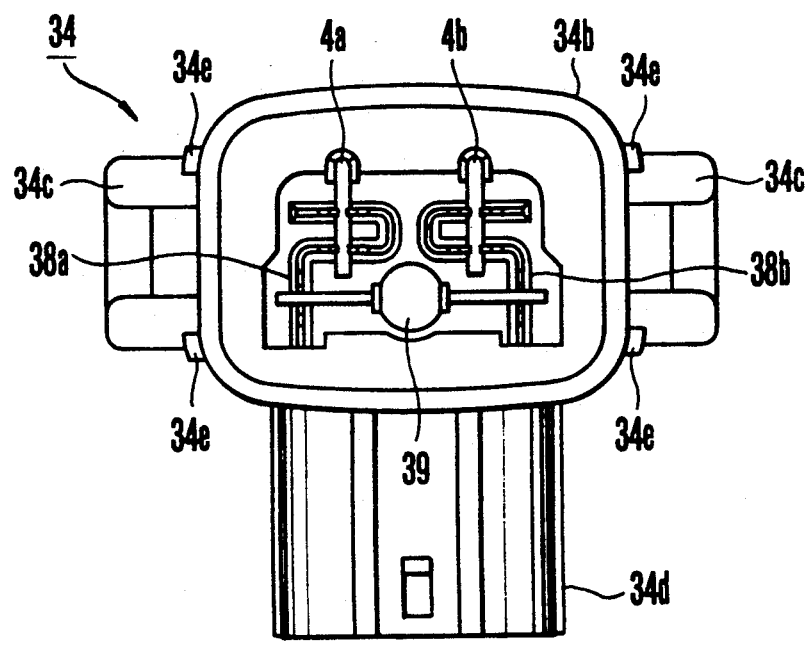
FIG. 5(a) is a plan view of a terminal base without a lid.
Figure 5B:
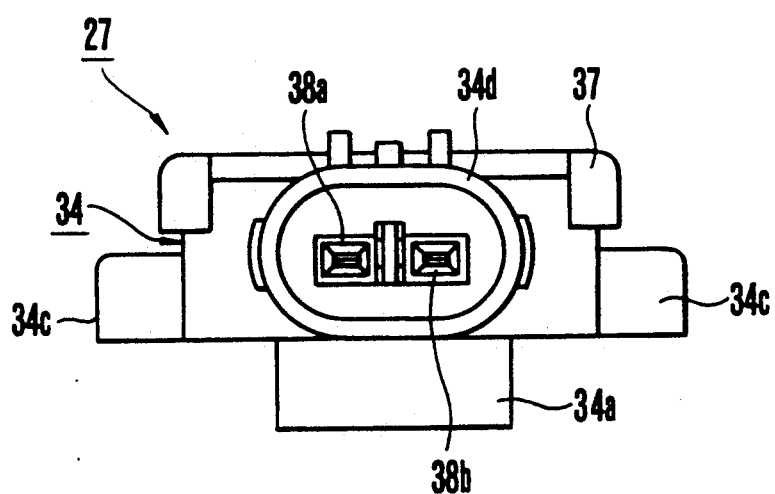
FIG. 5(b) is a front view of the terminal base.
Figure 5C:
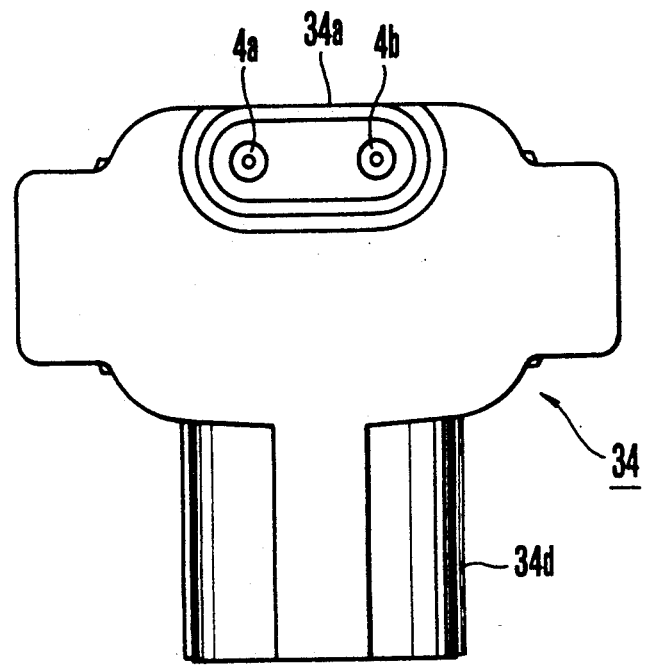
FIG. 5(c) is a bottom view of the terminal base.

FIGS. 1 to 5 show cases wherein electromagnetic coupling apparatuses of the present invention which are respectively defined by the first and second aspects are applied to an electromagnetic clutch. FIGS. 1 and 2 show the electromagnetic clutch. FIG. 3 shows an excitation unit. FIGS. 4(a) and 4(b) respectively show outer and inner coil bobbins. FIGS. 5(a) to 5(c) show a terminal base from which a lid is removed.

Referring to these drawings, an electromagnetic clutch 1 includes an annular yoke 3 having a U-shaped section which is fixed to, e.g., a housing of a vehicle compressor (not shown) through a mounting plate 2. An excitation coil 4 consisting of a plurality of turns of a winding member wound around a coil bobbin 17 (to be described later) is accommodated in an annular groove 3a of the yoke 3. An annular rotor 6 having an annular groove 6a which is loosely fitted on the yoke 3 from the opening side is rotatably supported by a cylindrical portion 5 formed on the housing side through a bearing 7 in such a manner that movement of the rotor 6 in the axial direction of the cylindrical portion 5 is restricted. A collared cylindrical hub 9 is fitted on the distal end portion of a driving shaft 8 which is formed on the compressor side so as to extend through the cylindrical portion 5. The hub 9 is fastened to the driving shaft 8 with a bolt 10. An armature 12 which is formed into a disk-like shape as a whole is riveted to an outer end portion of a leaf spring 11 having an inner end riveted to the hub 9 in such a manner that a friction surface 12a opposes a friction surface 6b of the rotor 6.

The armature 12 consists of outer and inner ring members 12c and 12d which are concentrically arranged in the radial direction through an annular gap 12b. A flat surface of the inner ring member 12d is in contact with a collar flat surface of stopper rubber 13 inserted in a hole formed in the collar 9a of the hub 9. That is, the armature 12 is elastically held by the hub 9 through the leaf spring 11. During a nonexcitation period of the excitation coil 4, a gap G denoted by reference symbol G in FIG. 1 is formed between the rotor 6 and the armature 12. Reference numeral 14 denotes a pulley fitted and welded on the outer surface of the rotor 6. For example, the pulley 14 is coupled to a pulley arranged on the crank shaft of a vehicle engine through a belt, and is designed to be driven and rotated by the engine. Reference numerals 4a and 4b respectively denote turn start and end portions of the excitation coil 4 which are guided into a terminal base 27 (to be described later) and are connected to an external circuit. When the excitation coil 4 is energized by ON-OFF control of this electrical circuit, the armature 12 is attracted to the rotor 6 due to a generated magnetic flux, and hence rotation of the rotor 6 is transmitted to the driving shaft 8 through the armature 12, the leaf spring 11, and the hub 9.

The yoke 3 as one of the constituent elements of an excitation unit which is denoted by reference numeral 16 as a whole is formed into an annular shape as a whole by pressing. The section of the yoke 3 is defined to be a substantially U shape by an annular bottom plate 3b, an outer flange 3c, and an inner flange 3d so as to define the annular groove 3a. The outer and inner flanges 3c and 3d defining the annular groove 3a are tapered such that their inner circumferential surfaces expand toward the opening end. A hole 3e is formed in a portion of the bottom plate 3b so as to receive the terminal base 27 therein, through which the turn start and end portions 4a and 4b are extracted. The excitation coil 4 wound around the coil bobbin 17 is housed in the annular groove 3a of the yoke 3. The coil bobbin 17 is constituted by inner and outer coil bobbins 18 and 19 made of a resin material. The inner coil bobbin 18 consists of a cylindrical portion 18a having an inner circumferential surface in contact with the outer circumferential surface of the inner flange 3d of the yoke 3, which has the tapered portion, and an annular flange portion 18b located to seal the opening end of the annular groove 3a. The inner coil bobbin 18 is formed into an annular shape having an L-shaped section. The outer coil bobbin 19 consists of a cylindrical portion 19a having an outer circumferential surface in contact with the inner circumferential surface of the outer flange 3c of the yoke 3, which has the tapered portion, and an annular flange portion 19b located to be in contact with the bottom is formed into an annular shape having an L-shaped section. A cylindrical opening portion 19c is interally formed with a portion of the flange portion 19b so as to be fitted in the hole 3e and to allow the start and end portions 4a and 4b of the excitation coil 4 to be inserted therein. The excitation coil 4 having autohesion properties, as an enameled wire having a two-layer structure obtained by, e.g., coating an autohesion layer on an insulating layer, is wound around the inner coil bobbin 18 by a plurality of turns prior to insertion in the annual groove 3a of the yoke 3. The outer coil bobbin 19 is joined to the inner coil bobbin 18 upon winding of the coil 4. As a result, the excitation coil 4 is covered with the coil bobbin 17 consisting of the inner and outer coil bobbins 18 and 19. When the coil bobbins 18 and 19 are to be joined to each other, a lock groove 18c formed in the inner coil bobbin 18 is engaged with a lock piece 19d formed on the outer coil bobbin 19 so as to allow tack welding for the coil bobbin 17. After this, entire peripheries of mating surfaces 20 and 21 of the coil bobbins 18 and 19 are joined to each other by ultrasonic welding. The start and end portions 4a and 4b of the excitation coil 4 are inserted into the cylindrical opening portion 19c and are guided outside. The coil bobbin 17, which is externally assembled in this manner, is forcibly inserted in the annular groove 3a of the yoke 3, and is fixed thereto so as not to be removed therefrom by caulking caulking pieces 22 and 23 formed at the opening end of the annular groove 3a. Note that reference numerals 18f and 19f denote grooves for guiding the turn start and end portions 4a and 4b of the excitation coil 4 to a through hole of the cylindrical opening portion 19c.

The coil bobbin 17, which is externally assembled in this manner, is forcibly inserted in the annular groove 3a while the inner and outer surfaces 18a and 19a of the coil bobbins 18 and 19, which respectively have the tapered portions, are fitted in the inner and outer walls 3b and 3c having tapered portions and formed on the annular groove 3a of the yoke 3. By caulking the caulking pieces 22 and 23, which are formed on the opening end of the annular groove 3a by pressing, the coil bobbin 17 is fixed to the annular groove 3a so as not be removed therefrom. In addition, the cylindrical opening portion 19c of the outer coil bobbin 19 is inserted in the hole 3e of the yoke 3.

A protruding opening portion 34a of a casing 34 of the terminal base 27 inserted in a through hole 2a of the mounting plate 2 welded to the rear surface of the yoke 3 is fitted in the through hole 3e of the yoke 3 in which the cylindrical opening portion 19c of the outer coil bobbin 19 is inserted. The cylindrical opening portion 19c of the coil bobbin 17 is forcibly inserted in the central hole of a rubber bush 35 for waterproof which is fitted in the protruding opening portion 34a.

The casing 34 of the terminal base 27 is made of a resin material, and is integrally constituted by a protruding opening portion 34a having a pair of through holes formed in its bottom portion, a housing 34b which is open to the above, and a pair of mounting flanges 34c. In addition, the casing 34 includes a housing 34d which is open to the front. The terminal base 27 includes a lid 37 which is forcibly fitted in the casing 34 through a packing 36 made of an elastic material. The turn start and end portions 4a and 4b of the excitation coil 4 inserted from the cylindrical opening portion 19c of the outer coil bobbin 19 are respectively connected to a pair of terminals 38a and 38b which are formed on the casing 34 by insert molding. The terminals 38a and 38b extend into the housing 34d and are connected to an external electrical circuit in the housing 34d. A surge absorbing diode 39 is arranged between the pair of terminal 38a and 38b and is connected thereto. The terminal base 27 is fixed to the rear surface of the yoke 14 by bending partially cut upright portions 2b and 2c, which are formed on the mounting plate 2 by pressing, into the groove of the flange 34c. Projections 34e formed on the outer periphery of the housing 34b are fitted in the lid 37.

An operation of the electromagnetic clutch having the above-described arrangement will be described below. Since the excitation coil 4 is connected to the external electrical circuit through the terminals 38a and 38b, the excitation coil 4 is energized by ON-OFF control of the electrical circuit. The armature 12 is then magnetically attracted to the rotor 6 against the biasing force of the leaf spring 11 by a generated magnetic flux. As a result, the rotation of the rotor 6, which is rotated together with the pulley 14 driven by the vehicle engine, is transmitted to the driving shaft 8, and the compressor is driven.

If the excitation of the excitation coil 4 is canceled in this state, since the magnetic attraction of the armature 12 is canceled, the armature 12 is separated from the rotor 6 due to the biasing force of the leaf spring 11. As a result, the gap G is formed between the friction surfaces 12a and 6b, and the transmission of rotation from the pulley 14 to the driving shaft 8 is interrupted to stop the compressor.

An assembly operation of the excitation unit 16 will be described below. Since the coil bobbin 17 is divided into the inner and outer coil bobbins 18 and 19 outside the yoke 3, the excitation coil 4 having the autohesion properties is wound around the inner coil bobbin 18 by a plurality of turns first. After the winding operation, the inner coil bobbin 18 and the outer coil bobbin 19 are joined to each other as follows. The lock groove 18c of the inner coil bobbin 18 is engaged with the lock piece 19d of the outer coil bobbin 19 and tack welding of the coil bobbin 17 is performed. As a result, the excitation coil 4 is covered with the coil bobbin 17 consisting of the inner and outer coil bobbins 18 and 19. At this time, the turn start and end portions 4a and 4b of the excitation coil 4 are extracted from the cylindrical opening portion 19c. Subsequently, final welding of the coil bobbin 17 is performed by joining the mating surfaces 20 and 21 of the coil bobbins 18 and 19 by ultrasonic welding. The coil bobbin 17 assembled in this manner is forcibly inserted in the annular groove 3a of the yoke 3. Since the inner circumferential surface of the annular groove 3a and the outer circumferential surface of the coil bobbin 17 have the tapered portions, the coil bobbin 17 is firmly fixed. After the forcible insertion, the caulking pieces 22 and 23 formed on the opening end of the annular groove 3a are caulked to fix the coil bobbin 17 to the annular groove 3a so as not to be removed therefrom. Since the protruding opening portion 34a of the terminal base 27 is inserted in the through hole 3e of the yoke 3 at this time, the cylindrical opening portion 19c of the coil bobbin 17 is forcibly inserted in the rubber bush 35 fitted in the protruding opening portion 34a, and the start and end portions 4a and 4b of the excitation coil 4 are guided into the terminal base 27 and connected to the terminal 38a and 38b, respectively. When the lid 37 is forcibly inserted in the opening portion of the housing 34c through the packing 36 after the connecting operation, the inside of the casing 34 is insulated from the outside.

Since the excitation coil 4 is covered with the resin coil bobbin 17 after such an assembly operation, the coil 4 is completely insulated from the yoke 3, and no moisture externally enters the coil bobbin 17.

In addition, since the inside of the casing 34 in which the start and end portions 4a and 4b of the excitation coil 4 are respectively connected to the terminals 38a and 38b is sealed by the lid through the elastic packing 36 and is shielded from the outside, no water enters the connected portions.

Furthermore, since the cylindrical opening portion 19c of the coil bobbin 17 is fitted in the protruding opening portion 34a of the terminal base 27 through the rubber bush 35 in the through hole 3e of the yoke 3, no water enters the terminal base 27 or the coil bobbin 17 through the through hole 3e.

Figures 6A, 6B:
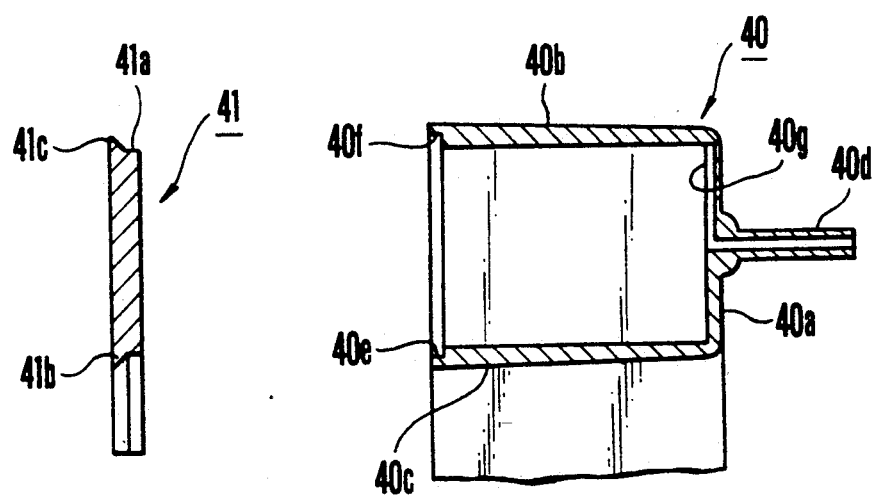

FIGS. 6(a) and 6(b) show main parts of a coil bobbin according to another embodiment of the present invention. FIG. 6(a) shows a main part of an outer coil bobbin. FIG. 6(b) shows a main part of an inner coil bobbin. In this embodiment, the coil bobbin is divided into inner and outer coil bobbins 40 and 41. The inner coil bobbin 40 is integrally constituted by a bottom plate 40a, an outer flange 40b, and an inner flange 40c in the form of an annular shape having a U-shaped section. A pair of cylindrical opening portions 40d are integrally formed at a portion of the annular bottom plate 40a so as to allow the turn start and end portions 4a and 4b of the excitation coil 4 to be inserted therein. The outer coil bobbin 41 is formed into a disk-like shape and is designed to seal the opening end of the inner coil bobbin 40. Welding portions 41b and 41c are respectively formed on the inner and outer peripheries of the outer coil bobbin 41 so as to have volumes smaller than those of annular grooves 40e and 40f formed at the opening end of the inner coil bobbin 40. Reference numeral 40g denotes a groove for guiding the turn start and end portions 4a and 4b of the excitation coil 4 into through holes of the cylindrical opening portions 40d.

With this arrangement, the excitation coil 4 around which the coil is wound is housed in the inner coil bobbin 40, and the turn start and end portions 4a and 4b are inserted into the cylindrical opening portion 40d so as to be extracted outside. Thereafter, a fitting portion 41a of the outer coil bobbin 41 is forcibly inserted in the opening end of the inner coil bobbin 40 to seal the inner coil bobbin 40, and the welding portions 41b and 41c of the outer coil bobbin 41 are joined to a mating surface of the outer coil bobbin 40 by ultrasonic welding. In this case, since the welding portions 41b and 41c of the outer coil bobbin 41 are formed to have volumes smaller than those of the annular grooves 40e and 40f of the inner coil bobbin 40, respectively, no burrs protrude from the end faces of the coil bobbin upon welding of these portions after they are fitted together. After the coil bobbin is assembled, it is housed in an annular groove 3a of a yoke 3 and is caulked by caulking pieces 22 and 23 in the same manner as described in the above-described embodiment.

In the above embodiments, the cylindrical opening portions 19c and 40d are integrally formed with the coil bobbins, respectively. However, as illustrated in FIG. 4(c) these portions may be independently constituted by rubber bushes, and the coating portions of the start and end portions 4a and 4b of the excitation coil 4 may be constituted by a resin material so as to perform solvent welding of extracted portions of the coil portions in the same manner as described above.

In each embodiment, the excitation coil 4 consists of a magnet wire having autohesion properties. However, excitation coils consisting of general magnet wires wound around the inner coil bobbins 10 and 40 may be fixed by winding tapes therearound.

Figure 7:
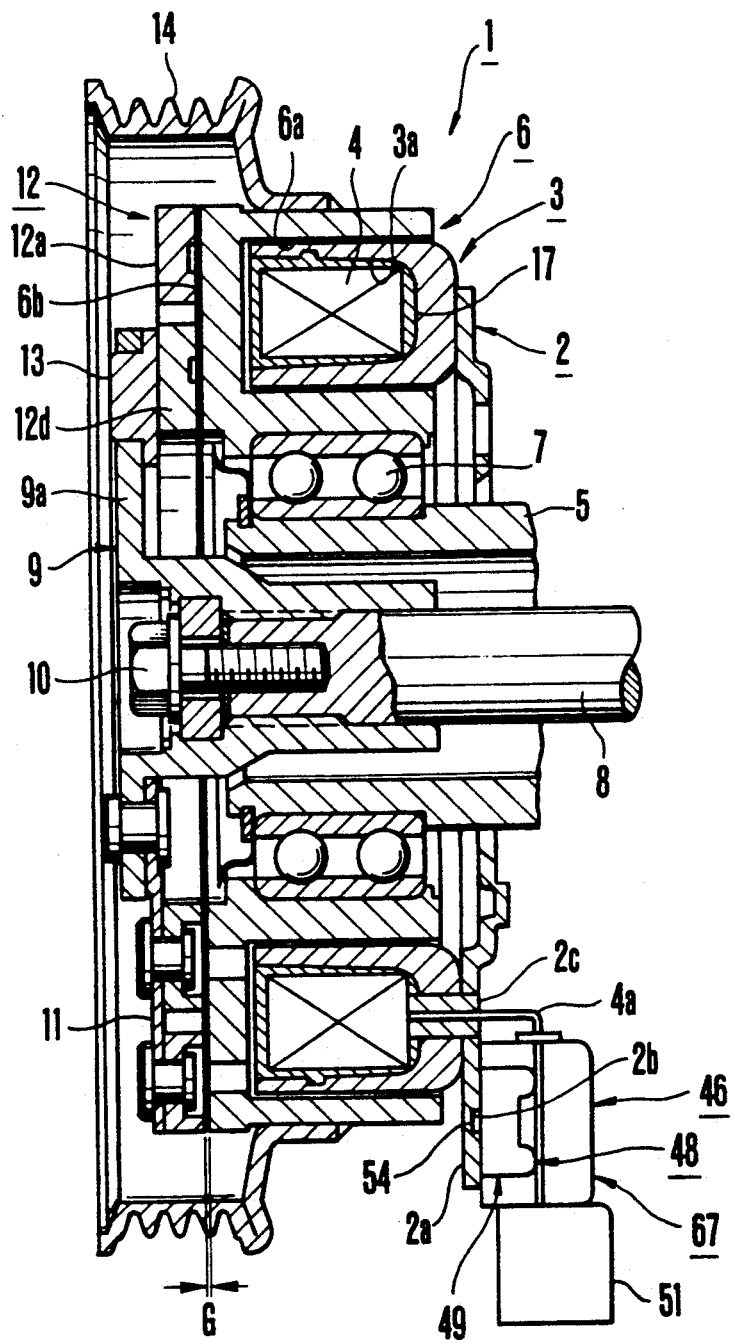
Figure 8:
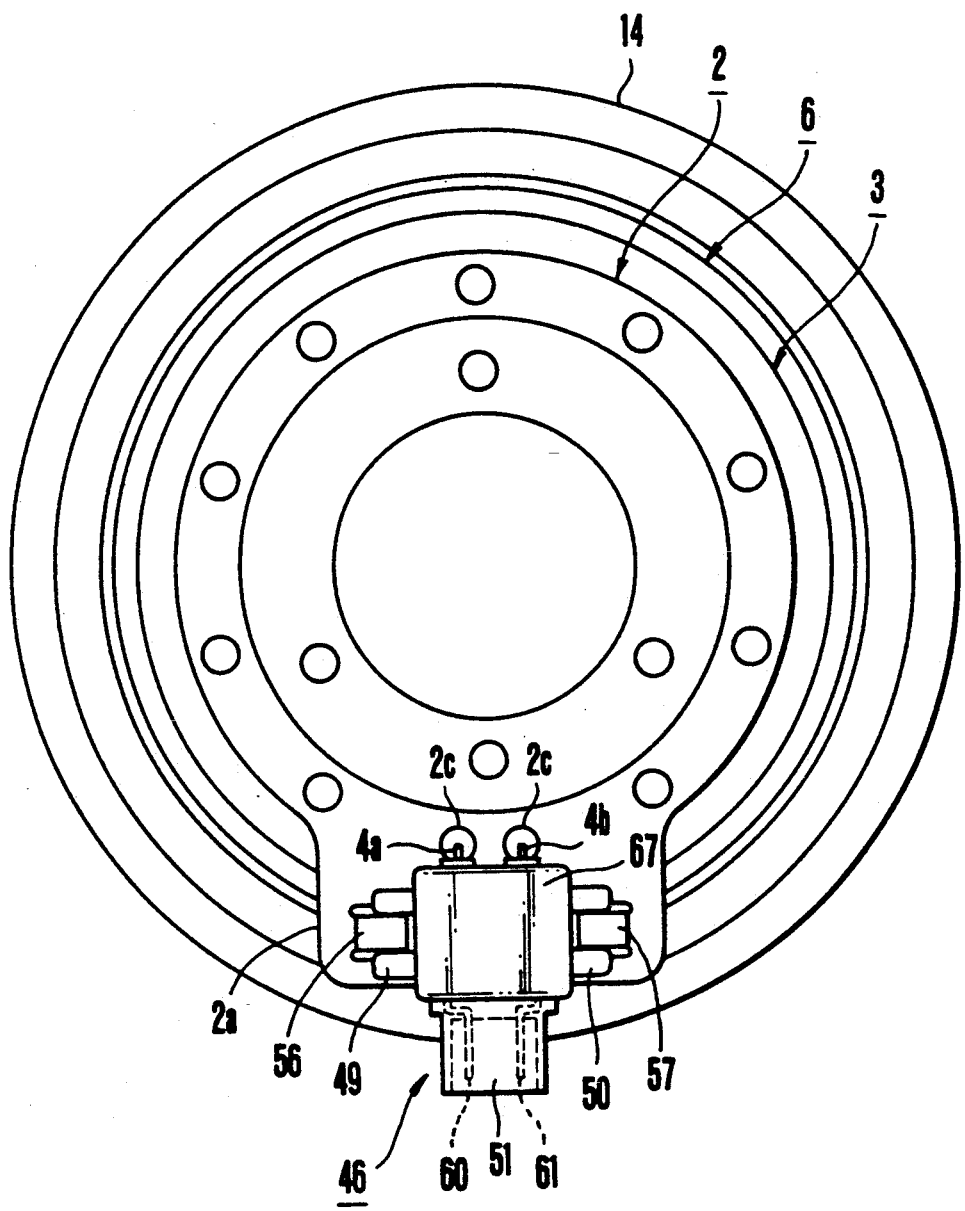
Figure 9A:
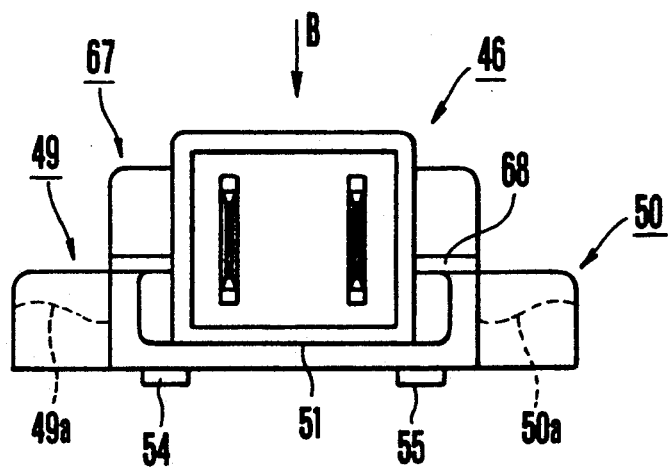
FIG. 9(a) is a plan view of a terminal base with a lid which is seen from a direction indicated by an arrow A in FIG. 9(b)
Figure 9B:
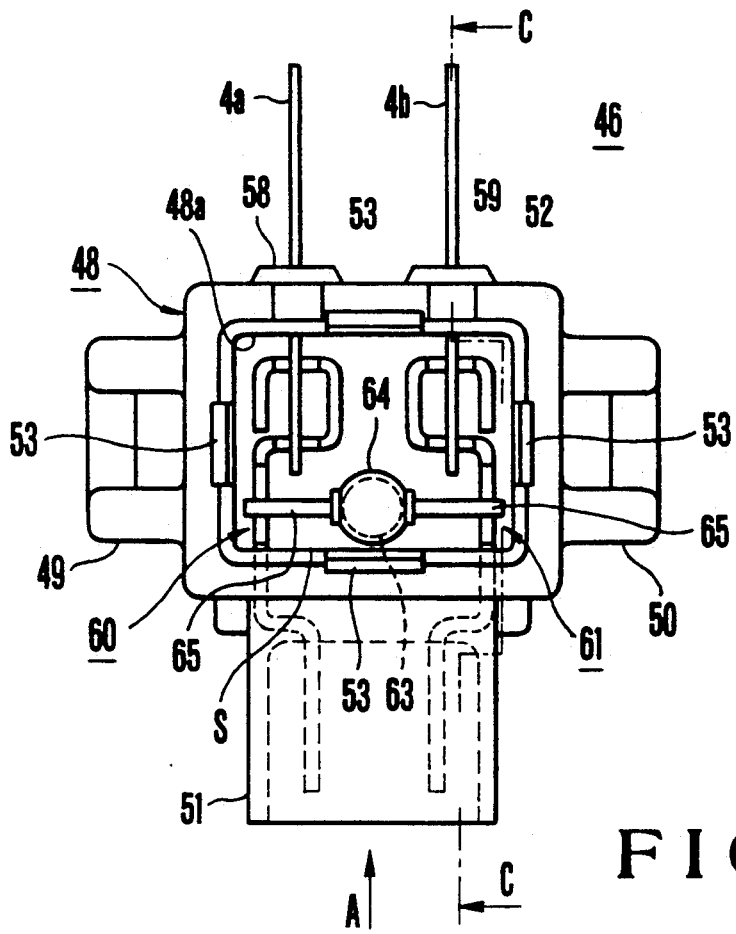
FIG. 9(b) is a plan view of the terminal base seen from a direction indicated by an arrow B in FIG. 9(a)
Figure 9C:
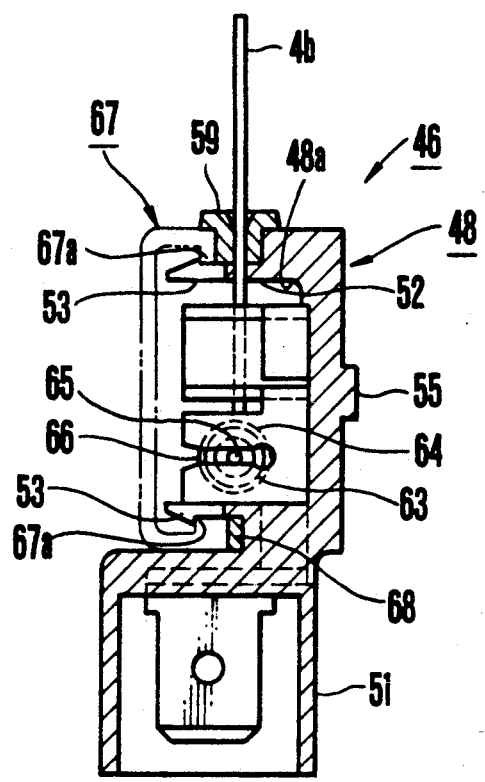
FIG. 9(c) is a sectional view taken along a line C—C in FIG. 9(b)
Figures 10A, 10B:
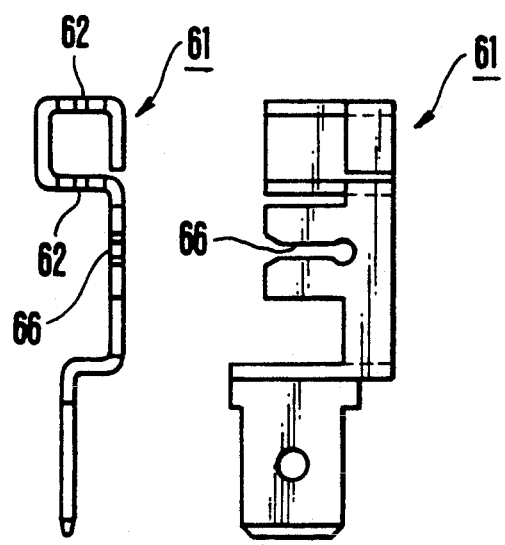

FIGS. 7 to 10(b) show a case wherein an electromagnetic coupling apparatus of the present invention defined by the third and fourth aspects is applied to an electromagnetic clutch for a compressor. FIGS. 7 and 8 show the electromagnetic clutch. FIG. 9(a) shows a terminal table with a lid. FIGS. 9(b) and 9(c) show the terminal table without the lid. FIGS. 10(a) and 10(b) show a terminal. The structure of the electromagnetic clutch shown in these drawings is the same as that shown in FIG. 1 except for the excitation apparatuses. Therefore, the same reference numerals in these drawings denote the same parts as in FIG. 1, and a description thereof will be omitted. A description will be made with reference to FIG. 1 as needed. Note that in this embodiment, a coil bobbin 17 is not constituted by divided components but is integrally formed.

A terminal base 46 which is composed of a resin material as a whole is fixed to the rear surface of a yoke 3, in which the excitation coil 4 is housed, through a mounting plate 2. The terminal base 46 is integrally constituted by a low-profile, box-like, rectangular parallelepiped casing 48 having an opening 48a in its front surface, U-shaped flanges 49 and 50, and a rectangular parallelepiped housing 51 with a bottom which protrudes downward from the casing 48. In addition, a thin forcible insertion wall 52 is integrally constituted by a resin material in the form of a rectangular parallelepiped shape so as to extend from the opening edge of the opening 48a. Resin lock pieces 53 which are formed into a thin, tongue-like shape so as to have elasticity are integrally formed at the middle portions of the four sides of the wall 52 so as to extend therefrom. The terminal base 46 having the above-described arrangement is fixed to the rear surface of the yoke 3 through the mounting plate 2 in such a manner that a pair of projections 54 and 55 formed on the outer bottom surface of the casing 48 are respectively fitted in recesses 2b formed in a flange 2a of the mounting plate 2 so as to perform positioning of the casing 48 and the mounting plate 2, and partially cut upright portions 56 and 57 of the mounting plate 2 are respectively bent by pressing to be urged against recesses 49a and 50a which are respectively formed in the flanges 49 and 50, thereby obtaining the low-profile casing 48.

Turn start and end portions 4a and 4b of the excitation coil 4 extracted from a rubber bush 2c of the flange 2a of the mounting plate 2 are respectively inserted into rubber bushes 58 and 59 fitted in semicircular grooves formed in the upper end of the opening 48a of the casing 48, and are guided into the casing 48. Each of the inserted portions 4a and 4b is connected to one end of a corresponding one of a pair of terminals 60 and 61.

The pair of terminal 60 and 61 are formed by punching and bending a plate material by pressing, and are formed by insert molding at the same time when the terminal base 46 is molded. These terminals 60 and 61 run parallel through the casing 48 from the ends where they are connected to the excitation coil 4, and extend downward with a space denoted by a reference symbol S in FIG. 9(b). The other end of each of the terminals 60 and 61 extends into the housing 51 and is connected to an external electrical circuit (not shown) through a plug in a female housing (not shown) fitted on the housing 51. The portions of the terminals 60 and 61 which are connected to the coil turn start and end portions 4a and 4b are substantially bent in the form of a rectangle. Slits 62 are respectively formed in opposite portions of the rectangular portions so as to allow the start and end portions 4a and 4b to be forcibly inserted therein. With this forcible insertion, mechanically and electrically satisfactory contact areas can be ensured between the turn start and end portions 4a and 4b and the terminals 60 and 61. Therefore, the start and end portions 4a and 4b can be firmly fixed to the terminals 60 and 61, and a sufficient electric capacitance can be obtained.

A surge killer diode 63 housed in a case 64 is arranged in the space S defined between the terminals 60 and 61. Leads 65 of the diode 63 are respectively inserted in slits 66 formed in the terminals 60 and 61 and connected thereto.

The opening 48a of the casing 48 of the terminal base 46 having the above-described arrangement is sealed by a lid 67. More specifically, the low-profile, box-like lid 67 is fitted on the forcible insertion wall 52 by causing a flange 67a formed on the opening end of the lid 67 to elastically deform the lock pieces 53. A waterproof packing 68 consisting of an elastic material such as rubber is inserted and clamped between the lid 67 and the opening edge of the casing 48. A semicircular groove is formed in the upper portion of the lid 46, and clamps rubber bushes 58 and 59 together with the semicircular groove of the casing 48.

An operation of the electromagnetic coupling apparatus having the above-described arrangement will be described below. The excitation coil 4 is connected to the external electrical circuit through the terminals 50 and 51 in the terminal base 46. Therefore, when the excitation coil 4 is energized by ON/OFF control of the electrical circuit, an armature 12 is magnetically attracted to a rotor 6 against the biasing force of a leaf spring 11 due to a generated magnetic flux. As a result, rotation of the rotor 6 which is driven by a vehicle engine and is rotated together with a pulley 14 is transmitted to a driving shaft 8, and a compressor is driven.

If the excitation of the excitation coil 4 is canceled, since the attraction of the armature 12 is canceled, the armature 12 is separated from the rotor 6 due to the biasing force of the leaf spring 11, and a gap G is formed between friction surfaces 6b and 12a. As a result, the transmission of rotation from the pulley 14 to the driving shaft 8 is interrupted, and the driving shaft 8 is stopped.

An assembly operation of the terminal base 46 will be described below. The pair of projections 54 and 55 formed on the casing 48 are fitted in the recesses 2b of the mounting plate 2 so as to perform positioning of the casing 48 and the mounting plate 2. Thereafter, the partially cut upright portions 56 and 57 of the mounting plate 2 are bent by pressing to be urged against the recesses 49a and 50a formed in the flanges 49 and 50, thus fixing the terminal base 46 on which the terminals 60 and 61 are formed by insert molding to the flange 2a of the mounting plate 2. The turn start and end portions 4a and 4b of the excitation coil 4, which are guided from the yoke 3 into the casing 48 through the rubber bush 2c, are forcibly inserted fixed in the slits 62 of the terminals 60 and 61. The case 64 in which the diode 63 is housed is arranged in the space S, and the leads 65 of the diode 63 are forcibly inserted and fixed in the slits 66 of the terminals 60 and 61, respectively. The lid 67 is fitted on the forcible insertion wall 52 formed at the opening portion of the casing 48 through the packing 68 which is interposed between the lid 67 and the opening edge. The lid 67 is depressed to be forcibly fitted on the wall 52 while it elastically deforms the lock pieces. When the flange 67a of the lid 67 is engaged with the lock pieces 53, the lid 67 is firmly fixed to the casing 48 so as not to be removed.

In this embodiment, the portions of the terminals 60 and 61 which are connected to the excitation coil 4 are bent in the form of a substantially rectangular shape. However, they may bent in the form of a V or S shape. In addition, a guide wall for storing the casing 64 of the diode 63 may be arranged in the casing 48 in order to prevent vibrations of the diode 63. Furthermore, in this embodiment, the flange 2a is formed on the mounting plate 2, and the terminal base 46 is fixed to the flange 2a. However, the terminal base 46 may be fixed to the rear surface of the yoke 3 in contact therewith, and the turn start and end portions 4a and 4b of the excitation coil 4 may be guided from the yoke 3 into the terminal base 46 without externally exposing the portions 4a and 4b.

In each embodiment, the electromagnetic coupling apparatus of the present invention is applied to the electromagnetic clutch. However, the present invention can also be applied to an electromagnetic brake for causing an armature to be magnetically attracted to an electromagnet, and the same effects as described above can be obtained.

As is apparent from the above description, in the electromagnetic coupling apparatus according to the first aspect of the present invention, the excitation coil consisting of a plurality of turns of a winding member is covered with the resin coil bobbin constituted by the two members and formed into a hollow annular shape, and the divided mating faces of the coil bobbin are joined to each other by ultrasonic welding. With this arrangement, an insulation failure of the excitation coil can be prevented without performing a cumbersome operation, e.g., injection of an insulating resin material into a yoke and its hardening. Therefore, operation efficiency can be improved, and automation of the respective steps can be realized, thus increasing the productivity of the excitation apparatus is increased.

In addition, according to the electromagnetic coupling apparatus of the present invention, the coil bobbin is constituted by the divisable members in the form of a hollow annular shape, the wound excitation coil is arranged in the hollow portion, the cylindrical opening portion formed on the coil bobbin is inserted in the through hole formed in the annular groove bottom of the yoke, and the turn start and end portions of the excitation coil are extracted from the cylindrical opening portion into the terminal base. With this arrangement, since no water externally enters the portion where the excitation coil is mounted, electric insulation of the excitation coil is perfectly ensured, and an insulation failure can be prevented. In addition, the protruding opening portion formed on the casing bottom of the terminal base is fitted in the through hole formed in the yoke so as to position the casing. This casing is fixed to the rear surface of the yoke with the partially cut upright portions of the mounting plate joined to the rear surface of the by solvent welding, and the lid is forcibly fitted on the opening formed in the upper portion of the casing through the packing consisting of an elastic material so that the connecting portions between the turn start and end portions extracted from the protruding opening portion and the pair of the terminals in the terminal base are shielded from the outside. With this arrangement, no water enters the connecting portions between the turn start and end portions and the pair of terminals, and their electric insulation can be perfectly ensured, thus preventing troubles such as an insulation failure. Furthermore, the cylindrical opening portion from which the turn start and end portions of the excitation coil are extracted is formed on the coil bobbin. The protruding opening portion which is fitted in the through hole formed in the yoke and allows the turn start and end portions to be inserted therein is formed on the bottom portion of the terminal base. The cylindrical opening portion is forcibly inserted and fixed in the protruding opening portion through the rubber bush. With this arrangement, no water enters from the through hole into the portion where the coil bobbin is mounted and the terminal base, thus perfectly ensuring electric insulation and preventing troubles such as an insulation failure. Since the cylindrical opening portion of the coil bobbin and the protruding opening portion formed on the casing of the terminal base are fitted in the through hole formed in the bottom portion of the yoke, the coil bobbin and the terminal table are prevented from rotation by the yoke and are fixed with the caulking pieces of the yoke and the partially cut upright portions of the mounting plate joined to the yoke by solvent welding so as not be removed. Therefore, disconnection of the connection portions of the turn start and end portions of the excitation coil and of the terminals can be prevented. Since such an insulation failure and disconnection can be prevented without resin molding, the preparation time can be shortened. Hence, the productivity can be improved, and labor can be saved.

Moreover, in the electromagnetic coupling apparatus according to the third and fourth aspects of the present invention, the pair of terminals are formed in the resin terminal base fixed to the rear surface of the yoke by insert molding so as to extend parallel with the space through the hollow portion formed by punching a plate member by a press. One end of each of the terminals is connected to a corresponding one of the turn start and end portions of the excitation coil arranged on the yoke side. The other end of each of the terminals is caused to extend from the terminal base to the outside, and the diode is arranged in the space between the terminals. The leads of the diode are respectively connected to the terminals. With this arrangement, the diode is housed in the terminal base, and the electromagnet is electrically connected to the external electrical circuit by connecting the electric circuit to the terminals in the terminal base. Therefore, the design of the electromagnet need not be changed regardless of the lengths of leads to be connected to the excitation coil or the presence/absence of a diode. Hence, versatility is improved. Since the size of the terminal base can be reduced, the overall electromagnetic coupling apparatus can be reduced in size. In addition, the casing having the opening formed in one surface is arranged on the terminal base. The resin lid for sealing the opening is forcibly fitted on the forcible insertion wall formed on the opening edge of the casing while the elastic packing is clamped between the lid and the opening edge. The pair of terminals, which are formed in the casing by insert molding, are respectively connected to the turn start and end portions of the excitation coil which are inserted in the casing through the rubber bush. The diode is arranged between the pair of terminals, and the leads of the diode are respectively connected to the terminals. Since resin lid is forcibly fitted on the resin terminal base, and the elastic packing is interposed between the terminals and the lid, no resin material need be injected, and the assembly operation can be simplified. Therefore, an increase in productivity and a decrease in cost can be realized.

What is claimed is:

1. An electromagnetic coupling apparatus comprising an excitation unit constituted by an excitation coil wound around a coil bobbin, a yoke in which said excitation coil is arranged, a resin terminal base casing fixed to a rear surface of said yoke, and a pair of terminals which are fixed in said terminal base casing by insert molding and are respectively connected to turn start and end portions of said excitation coil, wherein a cylindrical opening portion through which turn start and end portions of said excitation coil are extracted is formed on said coil bobbin, a protruding opening portion which is fitted in a through hole formed in said yoke and allows said turn start and end portions to be inserted therein is formed on a bottom portion of said terminal base casing, and said protruding opening portion is forcibly fitted and fixed in said cylindrical opening portion through a rubber bush.

2. An apparatus according to claim 1, wherein said coil bobbin and said cylindrical opening portion protruding therefrom toward said terminal base casing are independently formed.

* * * * *